3,542,597
FUEL CELL WITH AUTOMATIC MEANS FOR FEEDING REACTANT AND METHOD
John O. Smith, Swampscott, and Kurt W. Klunder, Reading, Mass., assignors to Monsanto Research Corporation, St. Louis, Mo., a corporation of Delaware
Filed Dec. 4, 1967, Ser. No. 687,850
Int. Cl. H01m 27/12
U.S. Cl. 136—86       2 Claims

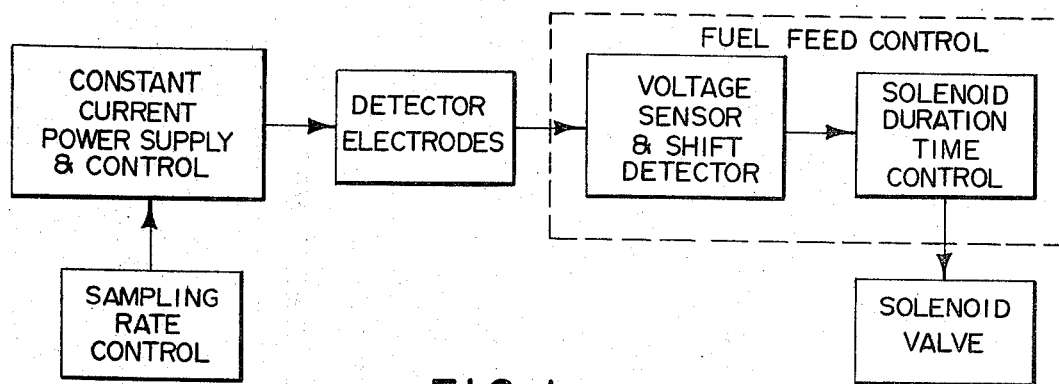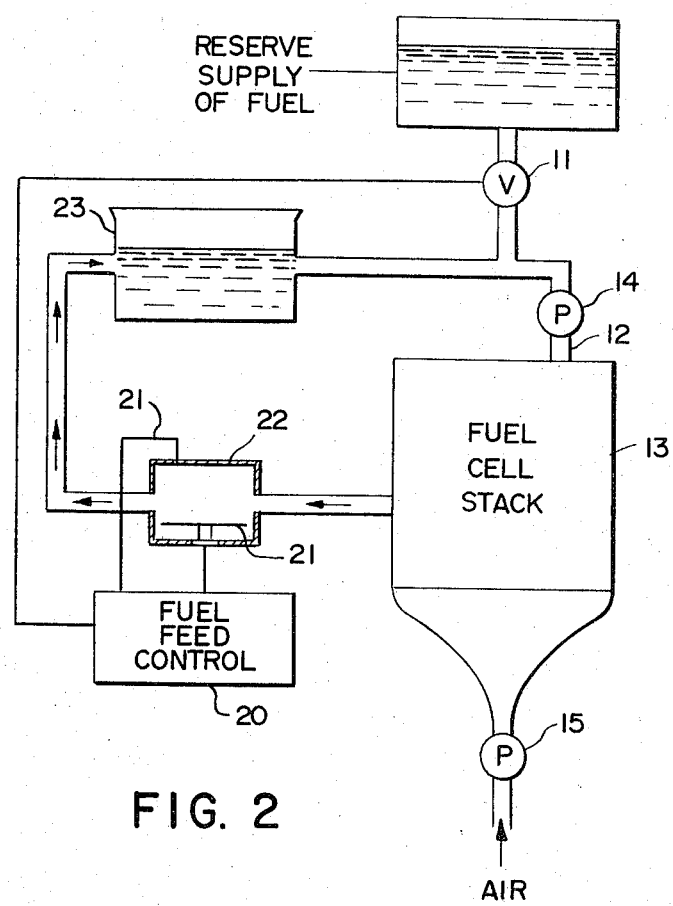

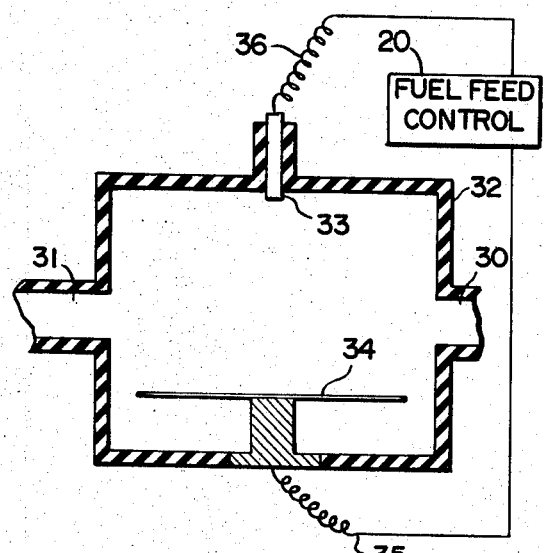
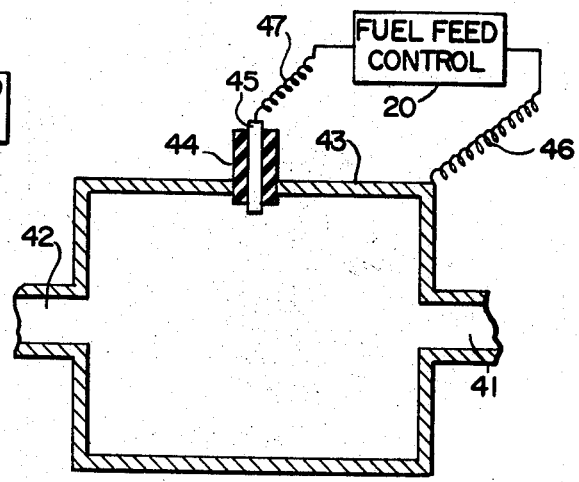
FIG. 3A
FIG. 3B
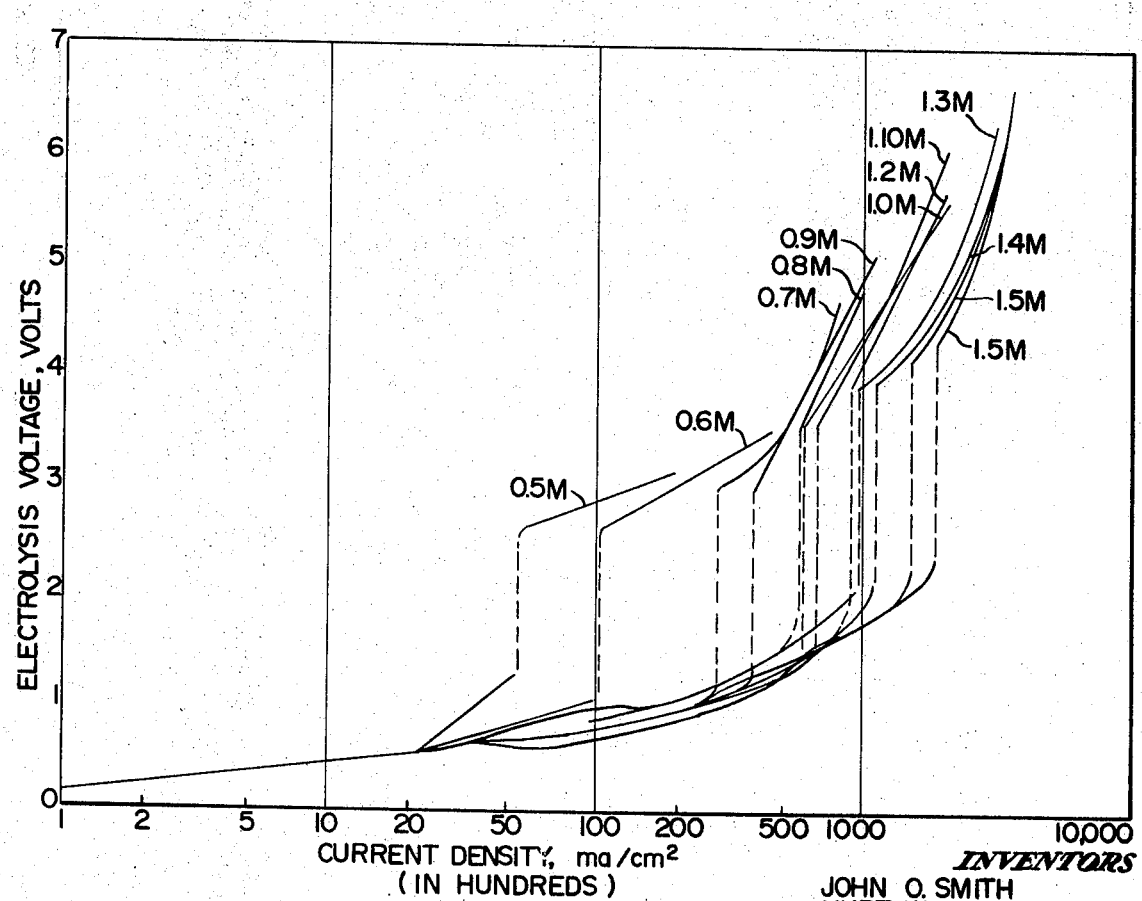
FIG. 4
INVENTORS
JOHN O. SMITH
KURT W. KLUNDER
BY John M. Brandt
AGENT United States Patent Office 3,542,597
Patented Nov. 24, 1970

ABSTRACT OF THE DISCLOSURE

A fuel cell reactant feed system including means for circulating a fuel or oxidant dissolved in an electrolyte through a fuel cell, means for holding a pair of detector electrodes in the electrolyte-reactant solution at a current density corresponding to a desired reactant concentration, means for sensing the voltage difference between the electrodes, and means for adding fuel or oxidant to the circulating electrolyte responsive to changes sensed in that voltage.

BACKGROUND

Field of invention

This invention relates to fuel or oxidant feed systems for fuel cells, and more particularly, to dissolved feed systems.

Prior art

During the operation of a fuel cell, it is necessary to provide for the controlled feeding of the reactants—oxidant and fuel—to the electrodes of a fuel cell. As these are consumed, the supply of reactants to the electrodes must be replenished. The systems required to accomplish this supply efficiently vary depending on the kind of materials involved. In many cases, where a gaseous feed such as an air oxidant is used, it is entirely satisfactory to pump the gas feed into the electrode and vent the exhaust outside the cell. In other systems, unreacted feedstocks are recycled to the cell stack.

Since the amount of feedstock consumed at the electrode will depend, within limits, on the power drawn from the electrodes, the amount needed to restore the original feedstock concentration prior to recycling will also vary. Efficient operation requires that the amount of feedstock added prior to recycling be made dependent on the amount consumed in the cell stack.

Numerous ways have been suggested to measure the concentration of fuel, for example, and to control the automatic addition of fuel to fuel cells, and several methods have been put into practice. The primary methods are those that (1) involve a response to the output load current only, (2) incorporate a response to both the load current and output voltage, or (3) involve either of the above with an additional compensation for operating temperature. Each has its particular advantages and disadvantages. For example, the load current response method is inherently insensitive to autocatalytic decomposition, common electrolyte losses, changes in anode efficiency, or unforeseen or temporary overconsumptions. The answer, usually, is to consider these factors as a group, place a numerical value on the total, add a safety factor, and apply the result to a load current-fuel requirement plot. A second fixed signal, with its own safety factor, is needed to maintain operation at open circuit, and very often a third is necessary for low temperature start-up conditions. The result is a higher fuel consumption rate than might otherwise be required. Experience has also shown that the efficiency is somewhat improved if the temperature compensation is included.

In the second method, the safety factors are not necessary because the voltage signal will compensate for many of the unforeseen conditions. The current sensitive portion establishes the voltage level that the system attempts to maintain. This alone is not enough since the system contains the seeds of its own destruction if it is allowed to add fuel continuously to correct for all possible voltage drop-offs. Thus, a second signal is needed, responsive to current, which limits the fuel feed rate at any given load. On the other side of the picture, there is the danger that the entire system operates too close to the "knee" of the voltage-fuel concentration curve to properly handle rapid changes in load currents. This method is further complicated if output voltage regulation is added.

Many fuel cell systems incorporate the use of dissolved feedstocks, for example, the fuel or oxidant may be dissolved in a liquid electrolyte, and this solution, which is designated the anolyte or catholyte may be circulated through the cell stack. To keep the reactant concentration at the desired level in the cell stack, means must be provided to replenish the electrolyte solution with reactant prior to its recirculation. In this kind of system, it is particularly difficult to provide means for keeping the reactant concentration in the cell stack constant. While pressure measurements can meter feedstock consumption with a recirculated gaseous feedstock, no measurable pressure changes occur with liquid reactants.

Volume changes in an anolyte or catholyte are usually due primarily to change in the electrolyte solvent concentration, i.e., water produced in the electrochemical reaction will dilute the electrolyte, while on the other hand evaporation may occur in the cell stack or elsewhere in the fuel cell system so as to result in concentration of the electrolyte. As a result it is impractical to add fuel to the system based on a volume change in the anolyte or catholyte.

As indicated above, relating the amount of fuel added as make-up based on the power drain on the cell is an indirect technique, which is subject to error. Thus, neither pressure nor volume nor power drain measurements are entirely satisfactory means for measuring fuel or oxidant consumption and controlling reactant addition in the dissolved feed type of fuel cell. Thus a highly desirable feature of any control system is a primary sensing mechanism, that is, one which is responsive only to the concentration of reactant in the electrolyte solution.

It is an object of this invention to provide a reliable and accurate sensing mechanism which determines fuel or oxidant concentration independent of the electrical output parameters of the cell.

It is another object of this invention to provide a concentration sensing mechanism which may be used to automatically control the addition of reactant to a fuel cell.

It is a further object of this invention to provide a concentration sensing mechanism independent of a comparison reference such as a voltage standard or a sample electrolyte-reactant solution.

This and other objects of the invention will in part be obvious and will in part appear hereinafter.

SUMMARY

This invention provides a fuel cell system in which a pair of electrodes held at a current density corresponding to a desired reactant concentration are positioned in the electrolyte-reactant exhaust. Means are provided to sense the potential difference across these detector electrodes. If the reactant concentration is in the desired range electrochemical disassociation of the reactant occurs at a characteristic voltage. If the reactant concentration is lower than desired, the electrodes electrolyze the electrolyte solvent rather than the reactant, and the voltage shifts accordingly. Means controlling addition of the reactant to the electrolyte are conrolled by the means sensing the detector electrode voltage. The reactant concentration in the electrolyte is thus kept in the desired range.

In the present invention, there is direct control of fuel or oxidant concentration by direct measurement of the voltage shift which occurs when the concentration exceeds or falls below a selected point. The problems noted above which arise in systems depending, for example, on expected fuel consumption, as proportioned to cell load, are thus avoided.

The system of this invention is simple and reliable. It requires use only of the electrode pair detector element, a supply of power to keep to electrodes at a constant current density, a detector electrode voltage sensor, and a feed control, such as a valve, operated by this sensor.

The invention has particular advantages as applied to a hydrazine-fueled fuel cell. The voltage for hydrazine electrolysis and that for water electrolysis are well separated, even at high current densities. The shift from hydrazine to water electrolysis occurs vritually instantaneously. Thus, tight control of the hydrazine consumption is readily achieved.

However, the shift time constant and electrolysis voltage separation may be considered a matter of choice and it should be understood that this invention is not limited to a particular set of time or electrolysis voltage parameters.

THE DRAWINGS

FIG. 1 illustrates, schematically, an electrical block diagram of a feed concentration detector and a feed control system;

FIG. 2 illustrates, in schematic form, the elements of the invention as embodied in a fuel cell wherein the fuel is dissolved in the electrolyte;

FIGS. 3A and 3B illustrate, in cross-section, embodiments of the detector electrode element unit, and;

FIG. 4 illustrates the voltage shifts observed in a hydrazine-potassium hydroxide anolyte at various current densities, as correlated with differing hydrazine concentrations.

PREFERRED EMBODIMENT

The invention may preferably be embodied in a hydrazine-fueled fuel cell with the fuel dissolved in an electrolyte to form an anolyte, and will be described with particular reference thereto. However, it should be emphasized that any anolyte or catholyte combination wherein the fuel or oxidant electrolyzes at a different potential than the electrolyte solvent may be used in the practice of this invention.

The general elements of a fuel cell are well known. Conductive structures constituting an anode and a cathode are assembled against opposite faces of an electrolyte-containing spacer or separator. Means, such as gasketing and manifolding around the periphery of such cell assemblies, are provided for access of the reactants to the cells in the cell stack formed by association of a number of individual cells. Thus, for example, means will be provided for access by the fuel to the anode and separator, and for access of an oxidant to the cathode. The oxidant may, for example, be air, which may be exhausted from the cells after use. For purposes of illustration an anolyte containing both electrolyte and fuel may suitably be 3–5.5 M aqueous KOH containing 0.5–1.5 M hydrazine. Provision is made for recirculation of the anolyte to the cell stack. Details of the particular cell construction form no part of this invention, and are known in the fuel cell art.

A pair of detector electrodes are mounted in the anolyte recirculation loop, which is the path in which the anolyte moves outside the cell stack. The recirculation loop includes cell stack inlet and outlet conduits and an anolyte reservoir. Preferably, the surface of one of the detector electrodes exposed to the anolyte stream is much greater than the exposed surface of the other. For example, the positive electrode may be a fine palladium wire with only a 0.005 inch diameter end surface exposed, the rest being embedded in an insulant such as an epoxy resin. The counter-electrode or negative electrode is preferably platinum. It can be a sheet of platinum metal, or even more advantageously, it can constitute substantially the entire interior of the detector electrode housing unit, when this and the positive electrode are properly electrically insulated. The current density at such a platinum negative electrode of large surface area will be relatively low, and its voltage will remain substantially constant in operation. By contrast, the current density at the positive electrode will be high, and it will change abruptly in voltage depending on whether the species being electrolyzed by it is the reactant, in this case hydrazine fuel, or the electrolyte solvent, for example, water.

Referring now to FIG. 1, there is shown a block diagram of the components of one embodiment of this invention. The detector electrodes are connected to a power supply which may be taken from the cell stack. In any case, the supply will be such as to maintain the detector electrodes, and particularly the positive electrode, at a selected current density corresponding to the desired hydrazine fuel concentration. Means for controlling the sampling rate may be included between the power supply and the detector electrodes to release pulses of power to the electrode at time intervals, so that the detector electrodes are operated only intermittently. Means may also be included to vary the selected current density. Circuitry for accomplishing such control is known in the art, and various known means can be used in this connection.

The voltage sensor means connected to the detector electrodes is a gating device responsive to the difference in voltage between the electrodes. While in the present example, the difference remains at about 1 volt, the hydrazine concentration in the anolyte is in the selected range and the detector electrodes are electrolyzing hydrazine. The 1 volt signal produced in this case will produce no response in the voltage sensor. However, if the hydrazine concentration falls and the positive electrode shifts to the water electrolysis voltage, a higher potential diffeernce of about 1.5 to 1.8 volts will exist between the detector electrodes. This voltage signal will trigger the voltage sensor means, causing it to emit current into the next segment of the feed control system.

Preferably though not necessarily, this signal may be fed through a variable time control which can convert the duration of the signal received to some different signal duration allowing an adjustable rate of fuel injection. As noted above, power may be fed to the detector electrodes in pulses, limiting their signal time, in which case such a conversion device may be desirable.

The above-discussed circuitry may all be microminiaturized using transistors and the like, as those skilled in the electronics art will appreciate, thus minimizing the drain on the power supply. For example, in an embodiment of this invention using 0.005 inch exposed surface positive electrode paired with a platinum black negative electrode, the current consumed by the detector electrodes may be of the order of 8 milliamperes. Accordingly, it will be desirable to amplify the current signal emitted before using to operate the means used to feed fuel to the anolyte. Any usual signal amplifying device may be used.

A normally closed solenoid-controlled valve in a gravity-feed line from the fuel storage tanks to the anolyte recirculation loop provides a convenient means for controlling fuel feed responsive to the signal generated by the above described system. Emission of a pulse of current from the fuel feed control system biases the solenoid valve open, permitting fuel feed to take place. When the signal stops, the valve closes, stopping fuel feed.

Referring now to FIG. 2 there is shown a schematic illustration of an embodiment of this invention showing an overall fuel cell feed system. Hydrazine (usually as hydrazine monohydrate) is gravity-fed from fuel reservoir 10 to the anolyte inlet 12 to cell stack 13 upon opening of a valve 11 controlled by the fuel feed control 20. The fuel feed control which opens this valve is activated by the voltage difference between detector electrodes 21 located in a detector electrode housing 22 in the anolyte recirculation loop. A pump 14, which may be manual but usually will be powered by an electrical motor (not shown), drawing current from the cell stack for example, produces anolyte circulation between anolyte reservoir 23 and the cell stack. A centrifugal pump 15 draws air from the atmosphere into the cell stack, where it is manifolded to the cathode air chambers; the air exhaust is vented from the cell stack to the atmosphere.

FIGS. 3A and 3B are cross-sectional views of a detector electrode housing unit configuration. In FIG. 3A, 30 is an inlet port and 31 is an outlet port permitting passage of the anolyte through an electrode housing 32 made of an insulating material such as hard rubber. The housing is penetrated by a wire 33 constituting the positive electrode, having only an end surface exposed to the housing interior. A plate counter-electrode 34 within the housing is connected to a wire lead 35 which is connected to fuel feed control 20. The positive electrode 33 is connected to fuel control 20 by lead 36.

In FIG. 3B, 41 and 42 are the inlet and outlet ports for anolyte passage in a housing 43 made of a metallic substance such as platinum or platinum coated steel. An insulating washer 44 penetrates the housing 43 and encloses a wire 45 constituting the positive electrode. Suitable means such as wires 46 and 47 are provided for connecting the electrically-conductive housing constituting the negative electrode and for connecting the positive electrode to fuel feed control 20.

FIG. 4 is a graph of current density plotted against electrode voltage, obtained by readings on a positive electrode made of palladium with a circular surface 5 mils in diameter exposed to an aqueous KOH solution containing different concentrations of hydrazine. The counter-electrode paired with this positive electrode is a platinum black electrode having a surface area such that its current density is essentially unchanged over the range of current values fed to the pair of electrodes. The counter-electrode remains at constant voltage, and the voltage signal measured is the difference between the potential of the counter-electrode and that of the positive electrode. The voltage signals are identified with the corresponding hydrazine concentrations, above which the voltage remains at the lower value and below which the signal rises to the higher value.

As will be appreciated, this invention is not limited to the specific preferred embodiment discussed above. For example, the electrodes need not be greatly disperate in size. The electrodes can be held at a selected constant curent density continuously, rather than being powered intermittently. Mechanical means actuated on signal from the voltage sensing device, can be used to produce reactant feed. Reactant feed can alternatively be produced by a pump driven by a motor actuated by power drawn from a power supply on signal from the voltage sensing means.

One possible fuel feed means, for example, useful particularly with hydrazine-fed cells, is electrochemical decomposition of the fuel. The hydrazine reservoir is a container closed except for the outlet conduit, and a pair of electrodes are immersed in the hydrazine, producing hydrogen and nitrogen gases. The pressure of these gases forces the liquid hydrazine out of the outlet conduit. In the system of the present invention, the means for sensing the voltage of the detector electrodes in the anolyte recirculation loop can be used to actuate supply of power to electrodes immersed in a hydrazine container, producing the described pressurization feeding effect.

Other possible variations within the scope of the present invention will be readily apparent to these skilled in the art.

For example, an electrolyzable reactant may be mixed with a non-electrolyzable reactant or one which dissociates at a potential above that of the electrolyte solvent. As long as the fuels or oxidants are mixed in the same ratio as they are consumed by the cell, a highly electrolyzable fuel or oxidant may function as a concentration indicator for one or more similar but less electrolyzable reactants.

The fuel cell may also embody any of a variety of additional features conducive to its efficient operation. For example, the anodes for a hydrazine cell may be porous nickel plaque, catalyzed by a surface deposit of palladium. These electrodes are liquid-permeable, and anolyte supplied to them on the side away from the electrolyte space between the anode and cathode will penetrate through the anode to provide electrolyte between the electrodes. Cathodes for consumption of air as an oxidant can be conductive wire mesh, with platinum black mixed with a binder such as poly-tetrafluorethylene applied over the mesh to provide a catalytic surface. Application of a vapor-permeable, water-proofing coating behind the catalytic layer permits feed of air to the electrolyte space but with prevention of electrolyte leakage through the cathode. Tabs or like connections can be provided for collection of current from the cells, which can be arranged as desired in series, parallel, or series parallel electrical connections all as known in the art.

As noted above, the electrolyte volume may be increased by water produced by the electrochemical reaction occurring in the cells thus affecting the amount of reactant required to maintain the desired concentration. Although the concentration sensing mechanism is independent of the volume of solution, it may be desirable to include means to control this dilution. For example, an electrolyte reservoir can include a volume sensor, such as a pair of electrodes located so as to be normally above the electrolyte solution surface. On dilution, volume increase of the electrolyte will cause it to rise in the reservoir to cover these sensor electrodes. These electrodes are in an electrical circuit which controls means to evaporate water from the electrolyte. For example, the flow of air through the cell stack may normally be such as to evaporate and draw away less water in the air stream exhaust than is produced in the electrochemical reaction. The electrical circuit including the sensor electrodes in the electrolyte reservoir may control means to increase this air flow rate to the point where more water is carried away in the air stream exhaust than is being produced by the electrochemical reaction. The circuit including these sensor electrodes is completed only when the electrolyte level in the reservoir rises to cover the electrodes, providing an electrically conductive connection through the electrolyte between them. When the means to evaporate water from the anolyte has thus been placed in operation, it acts until electrolyte concentration has been reduced so that the solution height in the reservoir has fallen below the position of the sensor electrodes. The circuit is thus broken, and the means to evaporate the water is thus deactivated.

The system and method of this invention for producing control of reactant feed in a fuel cell has been described with particular reference to a hydrazine-air fuel cell using an alkaline electrolyte. While the present invention has particularly advantageous application thereto, the principles of the invention can also be applied to other fuel cell electrochemical reaction systems. For example, the electrolyte solute can be a different alkali; such as NaOH, or it may be an acid, such as $H_3PO_4$. The oxidant can be one of a variety of electrolyzable materials such as a permanganate, dichromate, iodate, metaperiodate, chlorate, hypochlorate, or peroxide. The fuel can be some other soluble fuel, such as methanol or formaldehyde, for example. Indeed, although the electrolyte solvent will normally be water, other solvents such as methyl formate, for example, can be used as desired. Means for adapting the principles of this invention to such other systems will be readily apparent to those skilled in the art. Accordingly,

What is claimed is:

1. In a fuel cell wherein reactants comprising a fuel and an oxidant are supplied to said cell and wherein at least one of said reactants is electrolyzable at a first voltage when in solution with an electrolyte electrolyzable at a second voltage, apparatus for controlling the concentration of said electrolyzable reactant in said solution comprising in combination:
   (a) means for circulating and recirculating said solution through said cell;
   (b) a pair of detector electrodes immersed in said solution, said electrodes capable of electrolyzing said electrolyte and said reactant;
   (c) means for holding said electrodes at a constant current density corresponding to a selected reactant concentration;
   (d) means for detecting a shift in the voltage between said electrodes as said concentration changes and;
   (e) means for adding said reactant to said solution responsive to said voltage shift detecting means.

2. A method for controlling the concentration of at least one of the rectants comprising fuel and oxidant in a fuel cell, said controlled reactant being electrolyzable, comprising in combination the steps of:
   (a) preparing a solution of said reactant and an electrolyte electrolyzable at a voltage separate from the disassociation voltage of said reactant;
   (b) circulating said solution through said cell;
   (c) immersing a pair of detector electrodes capable of electrolyzing said reactant and said electrolyte in said solution;
   (d) holding said electrodes at a constant current density corresponding to a selected reactant concentration;
   (e) detecting the voltage shift between said electrodes as the concentration of said reactant falls below said selected reactant concentration;
   (f) adding a selected amount of reactant to said solution upon detecting said shift.

References Cited

UNITED STATES PATENTS

| | | | |
|---|---|---|---|
| 3,234,562 | 2/1966 | Bell et al. | |
| 3,390,015 | 6/1968 | Wilson | 136—86 |
| 3,425,873 | 2/1969 | Worsham et al. | 136—86 |

ALLEN B. CURTIS, Primary Examiner